(12) United States Patent
Le Mouel

(10) Patent No.: US 10,931,508 B2
(45) Date of Patent: Feb. 23, 2021

(54) SCALABLE DYNAMIC JMX FEDERATION

(71) Applicant: Oracle International Corporation, Redwood Shores, CA (US)

(72) Inventor: Philippe Le Mouel, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 57 days.

(21) Appl. No.: 16/027,085

(22) Filed: Jul. 3, 2018

(65) Prior Publication Data

US 2020/0014580 A1 Jan. 9, 2020

(51) Int. Cl.
*H04L 12/24* (2006.01)
*H04L 29/12* (2006.01)
*H04L 29/08* (2006.01)

(52) U.S. Cl.
CPC .......... *H04L 41/0233* (2013.01); *H04L 41/20* (2013.01); *H04L 61/1558* (2013.01); *H04L 67/1078* (2013.01); *H04L 67/1089* (2013.01); *H04L 67/1095* (2013.01); *H04L 67/289* (2013.01)

(58) Field of Classification Search
CPC ... H04L 41/0226; H04L 41/08; H04L 67/141; H04L 41/0856; H04L 41/0233; H04L 41/20; H04L 61/1558; H04L 67/289; H04L 67/1089; H04L 67/1095; H04L 67/1078; G06F 9/45504; G06F 9/5027; G06F 9/541
See application file for complete search history.

(56) References Cited

U.S. PATENT DOCUMENTS

| | | | |
|---|---|---|---|
| 6,754,664 B1 | 6/2004 | Bush | |
| 8,132,189 B1 * | 3/2012 | Fuchs | G06F 9/541 717/100 |
| 9,503,341 B2 | 11/2016 | Repperger | |
| 9,563,777 B2 | 2/2017 | Deng et al. | |

(Continued)

OTHER PUBLICATIONS

Youakim Badr , Salim Hariri , Youssif Al-Nashif , Erik Blasch; "Resilient and Trustworthy Dynamic Data-driven Application Systems (DDDAS) Services for Crisis Management Environments" https://www.sciencedirect.com/science/article/pii/S1877050915011783; Procedia Computer Science vol. 51, 2015, pp. 2623-2637 8 pages.

(Continued)

*Primary Examiner* — Jungwon Chang
(74) *Attorney, Agent, or Firm* — Trellis IP Law Group, PC

(57) ABSTRACT

An example framework and method facilitate instrumentation and management of computing environment resources, wherein the resources are distributed across various servers of the computing environment. The example framework employs a distributed synchronized tree or registry of information describing servers (e.g., MBean servers) and associated resources (e.g., as may be represented by MBeans) of the computing environment. A replica of the tree is maintained by each server. The tree facilitates peer-to-peer networking between participating servers for the purposes of discovering and sharing access to software management functionality (e.g., as may be provided via MBeans) offered thereby, and obviates reliance upon a centralized management server or network node to provide management functionality for all participating computing resources that may be distributed across servers of the network.

20 Claims, 6 Drawing Sheets

(56) References Cited

U.S. PATENT DOCUMENTS

| | | | |
|---|---|---|---|
| 9,692,654 B2 | 6/2017 | Rosier | |
| 2003/0069969 A1* | 4/2003 | Renaud | H04L 41/0226 709/225 |
| 2004/0221017 A1* | 11/2004 | Yoon | H04L 29/06 709/217 |
| 2004/0230973 A1* | 11/2004 | Cundiff, Jr. | G06F 9/5027 718/1 |
| 2004/0255264 A1* | 12/2004 | Simpson | H04L 41/08 717/100 |
| 2011/0019531 A1 | 1/2011 | Kim et al. | |
| 2013/0185667 A1 | 7/2013 | Harper et al. | |
| 2018/0314498 A1* | 11/2018 | Hulick | G06F 9/45504 |
| 2019/0075183 A1* | 3/2019 | Silberkasten | H04L 67/141 |

OTHER PUBLICATIONS

"Four-Part Framework for Resilient Data Center Architecture" http://bruns-pak.com/four-part-framework-resilient-data-center-architecture/ Mar. 14, 2018 8 pages.

"Resource reliability using fault tolerance in cloud computing" https://ieeexplore.ieee.org/document/7877391/ Next Generation Computing Technologies (NGCT), 2016 2nd International Conference on Oct. 14-16, 2016 Date Added to IEEE Xplore: Mar. 16, 2017 1 page.

\* cited by examiner

SCALABLE DYNAMIC JMX FEDERATION

CROSS REFERENCES TO RELATED APPLICATIONS

This application is related to the following application, U.S. patent application Ser. No. 16/027,100, entitled DYNAMIC RESILIENCY FRAMEWORK, filed on Jul. 3, 2018 which is hereby incorporated by reference as if set forth in full in this application for all purposes.

BACKGROUND

The present application relates to computing, and more specifically to software and accompanying methods for facilitating resilient scalable monitoring and/or control of computing resources of a computing environment.

Systems and methods for efficiently monitoring and/or controlling computing resources are employed in various demanding applications, including instrumentation of cloud-based enterprise computing environments, control and monitoring of Internet Of Things (IOT) devices and servers in networked computing environments, e.g., "sensor nets," and so on. Such applications often demand robust mechanisms for monitoring and/or controlling computing environment resources and that can efficiently and dynamically scale to meet the needs of growing or expanding computing environments.

Generally, networked computing environments may include large server clusters running concurrent processes that may access and use computing resources (e.g., web services, devices and accompanying software, etc.) from various servers of a given server cluster. For example, various computing environment processes (including administrator consoles) may require knowledge of available resources, health status of the resources, whether errors have been thrown, current computing load, server configuration, server state (status) change information, available memory, thread count, etc. Sensing such conditions is called resource instrumentation.

Conventionally, to implement computing resource instrumentation on a given server cluster, JavaBeans called Managed Beans (MBeans) may be employed. An MBean may include a collection of information (e.g., attributes or properties) describing a given computing resource that is monitored or managed by the MBean.

A network node manager may employ a master MBean server for a given server cluster. The master MBean server (which may run on a centralized administration server) may be tasked with retrieving instrumentation information from MBeans maintained on servers distributed among the associated server cluster.

A given MBean server may host many MBeans, and each MBean may manage a resource running in a Java Virtual Machine (JVM, also simply called VM) and may collect information associated therewith. The MBeans can be used to collect metrics and statistics on resource performance, usage, faults, etc.; for getting and setting application configurations or properties (push/pull); for issuing notifications of faults, state changes, and so on.

The master MBean server (and associated administration server upon which the master MBean server runs) often represents a hub of a "hub and spoke architecture," whereby the connections between the master MBean server and other remote MBean servers of the computing environment represent spokes. However, the master MBean server and accompanying administration server represent a "single point of failure." As such, if the master MBean server (the hub) is compromised, the monitoring of network resources of the computing environment (e.g., server domain comprising a server cluster) is compromised.

Furthermore, in very large computing environments, where the number of servers and number of users (e.g., network administrators) of the computing resources are large, a bottle neck may occur at the hub, which may be tasked with handling information requests from many clients, e.g., management consoles and other processes requiring instrumentation information for remote resources. This can inhibit computing environment scalability.

In addition, a user (e.g., administrator) employing a management console to connect to the hub to obtain information (e.g., health status) about available computing resources in the computing environment may be required to provide login credentials to each server being poled for MBean information. Repeatedly entering different credentials for different servers can be undesirably time consuming and error-prone.

SUMMARY

An example method facilitates augmenting computing environments with robust and efficient mechanisms for monitoring, controlling, and/or otherwise managing computing resources, in part by using a scalable framework that enables peer-to-peer networking of resource-monitoring servers (e.g., Managed Bean (MBean) servers), resulting in scalable and dynamic server federations. Each server of the federation can readily access and use data and/or functionality of other servers of the federation. Detailed information (e.g., health status, etc.) about computing resources (e.g., instrumentation data) is now readily obtainable from and shareable among all participating servers, without reliance upon a centralized management server (e.g., an administration server). This overcomes various shortcomings with previous approaches to server cluster instrumentation and resource management, e.g., in part by obviating the need for processes to rely upon a centralized administration server (which can represent a single point of failure) for access to remote resource instrumentation information and functionality.

The example method facilitates selectively sharing software management data and/or functionality among components of a computing environment, and includes: receiving a query from a client module (e.g., a management console) in communication with a first server (e.g., an application server running in a Java Virtual Machine (VM) and hosting an MBean server), the query requesting access to information about software management functionality available on a second server; using the query to retrieve information pertaining to the software management functionality from a shared distributed record (e.g., a tree of replicated and synchronized server connection information), wherein the information has been registered in the shared distributed record, resulting in retrieved information (e.g., MBean server names, connectors, types, etc.) in response thereto; employing the retrieved information to create a local logical proxy (also called virtual proxy) for the software management functionality running on the second server, the logical proxy running on or accessible via the first server; and selectively providing the software management data and/or functionality (using the local logical proxy and the retrieved information) to the client module (e.g., to an administrator management console and user interface) in response to one or more requests therefrom for access to the software management data and/or functionality.

In a more specific embodiment, the retrieved information includes a connector (and/or information thereabout, e.g., connector type, etc.) for software management functionality specified in the query. The connector includes code for connecting to the software management functionality. The software management functionality may be implemented via one or more computing resources, which are exposed as MBeans on an MBean server running on the second server (which may be implemented using a VM).

In the specific example method, the step of employing the retrieved information further includes using the retrieved information to generate one or more proxy MBeans (e.g., virtual proxied MBeans, also called logical MBean proxies or logical proxied MBeans) for the one or more remote MBeans (e.g., MBeans characterizing the second server); and using one or more connectors (specified via the retrieved information) to use the one or more virtual proxy MBeans to access data and/or functionality of the one or more remote MBeans.

The first server includes a first application server running in a first virtual machine. Similarly, the second server includes a second application server running in a second virtual machine. Accordingly, the first virtual machine and the second virtual machine host the first application server and second application server, respectively, which are part of a similar server cluster. The server cluster may include plural servers that are part of an administrative domain.

The administrative domain is federated via code running one or more dynamic discovery modules (also called federation modules herein) in communication with one or more replicated global namespaces as may be implemented, in part, via a name hierarchy manifested in a replicated, synchronized tree that is shared among the plural servers (via the constituent MBean servers running on the plural servers). The global namespace may be implemented, at least in part, via a Java Naming and Directory Interface (JNDI), Apache Zookeeper™, or other suitable technology.

Accordingly, each server of a computing environment server cluster runs a local MBean server. The local MBean server that is running on a given application server maintains access to a copy of the distributed tree; data of which is synchronized among participating MBean servers. The distributed tree facilitates discovery of exposed MBean servers and accompanying resources (e.g., as may be represented via MBeans), information (e.g., connection information, including information about participating MBean servers, connectors/adaptors used to communicate with the MBean servers, etc.) about which has been registered in the distributed tree. The distributed tree facilitates discovery of exposed resources of the application servers throughout the cluster from any local MBean server running on any of the application servers of the cluster. Each local MBean server may discover exposed resources by referencing the replicated tree to obtain connectors for connecting to remote MBean servers and implementing MBean queries thereon.

Use of the distributed tree, in combination with use of shared computing objects (e.g., MBeans) as discussed herein, facilitates accommodating and managing (including instrumentation) rapidly evolving computing environments and associated server clusters. Servers can be readily added to or removed from the computing environment without compromising operations of other servers.

Each federated MBean server may access the distributed tree (e.g., in response to a query from an administrator or management console application) in response to a query for an MBean of a given type and/or other criteria. The MBean server may then retrieve or otherwise obtain the appropriate connector (to connect to a remote MBean server) matching the query and in accordance with information supplied via the distributed tree. The MBean server may then use the retrieved connector to obtain the remote MBeans (i.e., to obtain access to data and/or functionality of the remote MBeans). The obtained remote MBeans may be implemented as logical proxied MBeans that become locally accessible to the MBean server. The logical proxied MBeans may be used by management console software applications and/or other client computing resources.

Hence, various embodiments discussed herein provide a robust, dynamic, and scalable framework or architecture that facilitates decentralized management of complex heterogeneous domains. Resiliency is enhanced by allowing any of the application servers and associated MBean servers and VMs to provide federated access to all of the resources of the other participating servers and VMs. Client applications (e.g., management consoles) need not connect to a master MBean server (e.g., of a centralized administration server) to obtain data (e.g., instrumentation data) about other remote (i.e., running on a different server) resources of the computing environment. The client applications may merely access any participating (federated) MBean server to automatically access all MBeans registered on various MBean servers of the computing environment.

Furthermore, developers can readily expose manageable resources for use in such server federations, e.g., using simple MBeans. Java Management eXtensions (JMX) technologies can be readily leveraged to cost-effectively implement communications between participating computing environment components (e.g., servers, VMs, etc.) in various computing environments, including not just cloud-based enterprise applications, but Internet Of Things (TOT) and other types of computing networks. Accordingly, embodiments may be readily incorporated into many products and platforms, and can be particularly well suited for cloud computing, where computing resources are often spread across many VMs.

A further understanding of the nature and the advantages of particular embodiments disclosed herein may be realized by reference of the remaining portions of the specification and the attached drawings.

DETAILED DESCRIPTION OF EMBODIMENTS

Figure 1:
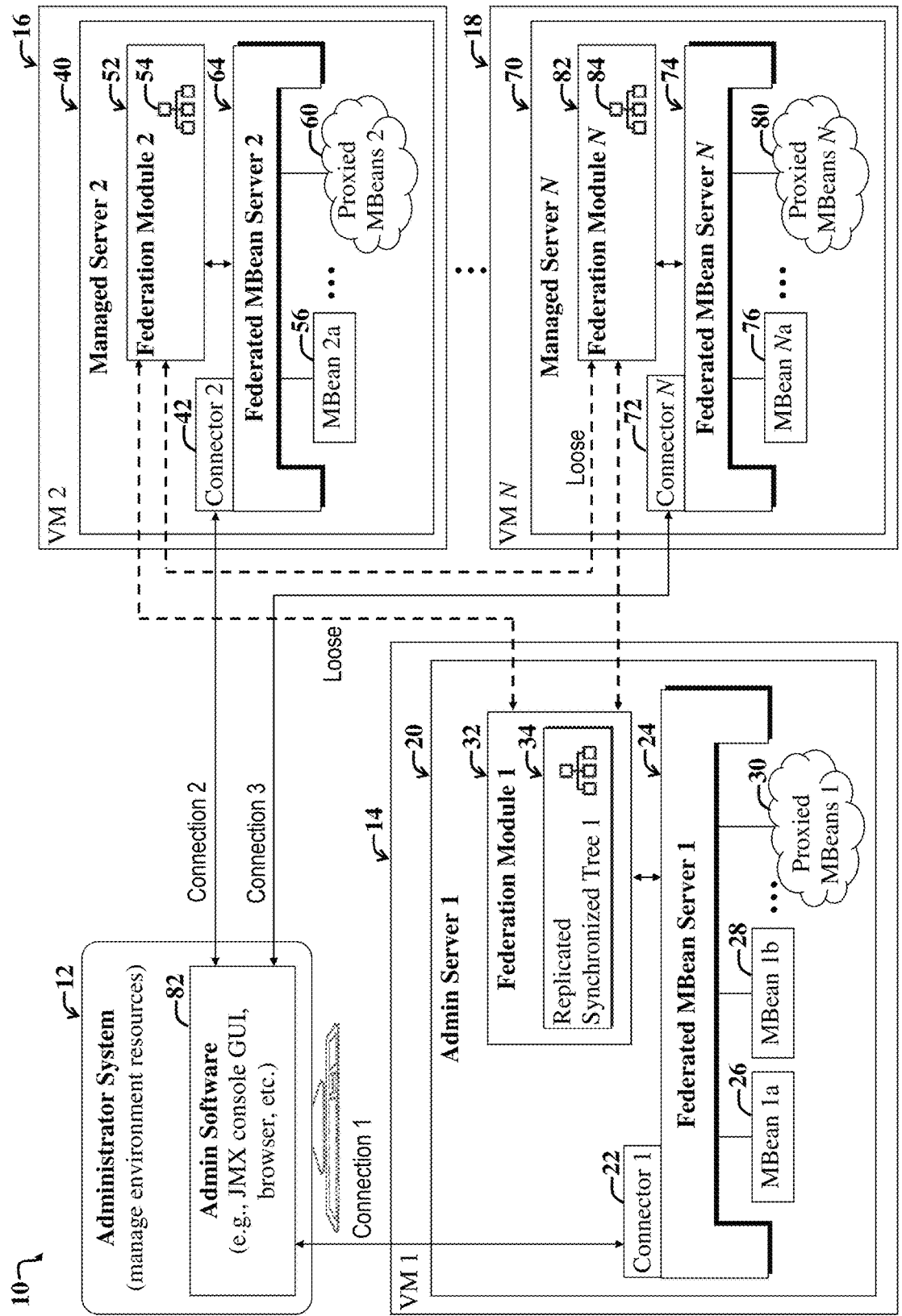
FIG. 1 is a first block diagram illustrating a first example system and accompanying computing environment that incorporates a scalable dynamic and resilient federation of servers of a server domain to facilitate efficient and robust management and/or control of computing resources thereof.

For the purposes of the present discussion, a computing environment may be any collection of computing resources used to perform one or more tasks involving computer processing. A computer may be any processor in communication with a memory. Generally, computing resource may be any component, mechanism, or capability or quantities thereof of a computing environment, including, but not limited to, processors, memories, software applications, user input devices, and output devices, servers, processes, threads, and so on.

Specifically, the resources discussed herein are computing resources that can be quiesced or unquiesced, e.g., a process, software application, database connection, runtime, message handler, load balancer, mount point on a file system, and so on. A resource is said to be quiesced if it is taken offline, disconnected from the computing environment, or otherwise paused or altered, such as in preparation for certain remediation actions, backups, maintenance, and so on. Similarly, an unquiesced system is online, i.e., operating within the computing environment.

An enterprise computing environment may be any computing environment used for an enterprise. An enterprise may be any organization of persons, such as a business, university, government, military, and so on. The terms "organization" and "enterprise" are employed interchangeably herein.

An example enterprise computing environment includes various computing resources distributed across a network and may further include private and shared content on intranet web servers, databases, files on local hard discs or file servers, email systems, document management systems, portals, and so on. The terms "computing system" and "computing environment" may be used interchangeably herein.

For the purposes of the present discussion, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. A Service Oriented Architecture (SOA) server may be any server that is adapted to facilitate providing services accessible to one or more client computers coupled to a network.

The terms "client," "client application," "client software application," may be employed interchangeably herein when referring to software that issues one or more request messages that are addressed to another computing resource, called the server-side application herein. The term "client device" as used herein refers to the computer hardware and accompanying client software application(s) running thereon or therein.

Similarly, depending upon the context in which the term is used, the term may refer to a combination of hardware and software, or may refer to software that supports the running of server-side applications and may include a collection of one or more servers, i.e., a server system, as may be implemented as one or more server domains.

An application server may be a software framework (and/or hardware that supports the software framework, depending upon the context in which the term is used) for providing computing resources for supporting the creation of and running of software applications, e.g., web applications, including web services, APIs, database applications, and so on, that provide data and/or functionality to other software applications, called client applications.

Generally, an application server includes computing resources for running software applications that may provide data and/or functionality to one or more client devices. An application server may back one or more web pages running on one or more web servers, wherein the web pages facilitate providing User Interface (UI) controls to enable a user of a client device or system to interact with functionality afforded by the underlying application server and applications and/or data running thereon and/or stored thereby. Generally, a web server may be any server specialized to provide web pages and/or other end-user content to client devices or applications (e.g., web browsers).

A networked computing environment may be any computing environment that includes intercommunicating computers, i.e., a computer network. Similarly, a networked software application may be computer code that is adapted to facilitate communicating with or otherwise using one or more computing resources, e.g., servers, via a network.

A networked software application may be any software application or computer code adapted to use data and/or functionality provided via one or more resources, e.g., data, memory, software functionality, etc., accessible to the software application via a network.

Enterprise software applications, including applications for implementing cloud services, are often distributed among one or more servers as part of a computing domain, also called a server domain herein. For the purposes of the present discussion, a computing domain may be any collection of one or more servers running software that is managed by a single administrative server or associated application. An example of a computing domain is a WebLogic Server (WLS) domain.

A cloud service may be any mechanism (e.g., one or more web services, Application Programming Interfaces (APIs), etc.) for enabling a user to employ data and/or functionality provided via a cloud. A cloud may be any collection of one or more servers. For example, certain clouds are implemented via one or more data centers with servers that may provide data, data storage, and other functionality accessible to client devices, such as the smart device behavior analysis and control system 128, via the Internet.

A software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

Systems integration may refer to the establishment of communications between systems, e.g., software systems. When software systems to be integrated include enterprise applications, the integration process may be called Enterprise Application Integration (EAI). When the software systems run on a cloud (e.g., a collection of one or more networked server systems), then integration of the software systems may be called Cloud Application Integration (CAI). Note that embodiments discussed herein are not necessarily limited to a particular type of computing environment or types of software systems being integrated.

For the purposes of the present discussion, a JavaBean may be a type of computing object; specifically, a class that may encapsulate plural computing objects into the overall computing object, i.e., the JavaBean. An MBean may be a type of JavaBean that represents a resource running in a VM, and which can incorporate functionality for monitoring and/or sensing information characterizing the resource and/or otherwise facilitate management of the represented or interfaced computing resource and facilitate instrumentation of the esource. An MBean may include a specification of attributes or data that it collects; operations, e.g., methods that it implements or supports; messages or notifications that it sends, and so on.

Various embodiments discussed herein implement a federation of servers in accordance with one or more resiliency frameworks. For the purposes of the present discussion, a resiliency framework may be any mechanism or collection of mechanisms, which may include computing rules, guidelines, formats, and so on, for supporting, facilitating, or otherwise fostering resiliency of a computing environment. The computing rules and guidelines may be incorporated as adaptable reusable code that provides support for different implementations of software systems incorporating the framework.

Embodiments of the federation framework discussed herein may be extensible, nestable, and generally adaptable to various types of computing environments and accompanying server clusters, clouds (e.g., supporting cloud services), and so on. The terms "resiliency architecture" and "resiliency framework" may be employed interchangeably herein. Examples of additional resiliency frameworks that may be used with embodiments discussed herein are discussed more fully in the above-identified and incorporated co-pending U.S. patent application Ser. No. 16/027,100, entitled DYNAMIC RESILIENCY FRAMEWORK, filed on Jul. 3, 2018 (Attorney ref. ORACP0237/ORA180597-US-NP).

The resiliency of a computing environment may refer to computing environment reliability, e.g., an ability to be resistant to faults, data and processing overloads, computing inefficiencies, and so on. Accordingly, a relatively resilient computing environment may be relatively reliable, fault tolerant, and have an ability to adapt to problems (e.g., software errors, misconfigurations, malware attacks, and so on) with individual computing resources and/or collections thereof. Relatively resilient computing environments may be relatively capable of maintaining computing efficiency (e.g., resource-utilization efficiency) in the face of challenges, e.g., network overloads, data server failures, and so on.

For clarity, certain well-known components, such as hard drives, processors, operating systems, power supplies, Internet Service Providers (ISPs), class loaders, bytecode compliers, job trackers, task trackers, Managed Bean (MBean) servers, Java Virtual Machine (JVM) garbage collectors, connector servers, and so on, are not necessarily explicitly called out in the figures. However, those skilled in the art with access to the present teachings will know which components to implement and how to implement them to meet the needs of a given implementation.

FIG. 1 is a first block diagram illustrating a first example system 10 and accompanying computing environment that incorporates a scalable dynamic and resilient federation of servers of a server domain to facilitate efficient and robust management and/or control of computing resources thereof. The example system 10 includes a first Virtual Machine (VM 1) hosting an administration server 20 and additional VMs (including a second VM 16 and an Nth VM 18). The additional VMs 16, 18 host managed servers 40, 70. Collectively, the VMs 14-18 represent an example server cluster of a server domain. A client-side administrator system 12 may communicate with one or more servers 20, 40, 70 of the system 10 and accompanying networked computing environment.

In general, a server running on or represented by a VM is said to be virtualized. For the purposes of the present discussion, a virtualized computing process or application may be a process or application that is associated with a layer of abstraction, called a VM, that decouples, at least in part, physical hardware from the process or application. A VM may have so-called virtual hardware, such as virtual Random Access Memory (RAM), Network Interface Cards (NICs), and so on, upon which virtualized applications, such as operating systems and servers, are loaded. The virtualized computing processes may employ a consistent virtual hardware set that can be substantially independent of actual physical hardware.

For the purposes of the present discussion, a managed server may be any server that is part of a server cluster that is managed by one or more management entities, e.g., an administration server (e.g., the administration server 20). Servers that are managed by a given administration authority are said to be part of a server domain or computing domain governed by the administration authority. An example of a computing domain is a WebLogic Server (WLS) domain governed by a WLS administration server, which may administrate node managers, which may in turn administrate WLS managed servers within each node, wherein each node may include plural managed servers running on a particular machine. The computing domain may represent a particular server cluster. Each server of the server cluster, i.e., each managed server, may be implemented using one or more VMs herein.

Certain MBeans may facilitate collecting metrics (e.g., descriptive values) pertaining to computing environment characteristics, such as performance, resource input versus throughput or bandwidth, faults, state changes, and so on. MBeans may be equipped with methods for getting (e.g., pulling) and setting (e.g., pushing) resource configurations, properties, responding to faults (e.g., quiescing), and so on. Generally, in certain implementations, computing resources of the system 10 may be implemented and exposed using MBeans 26-30, 56, 60, 76, 80.

For the purposes of the present discussion, a resource is said to be exposed if it is made available for discovery by one or more other computing environment resources, e.g., management consoles, other processes, etc., e.g., via registration with an MBean server. Note that specific implementations of the example system 10 may use MBeans, which may he exposed to not just local resources (e.g., resources of a particular server), but to other servers 16-18 of the system 10 and accompanying computing environment, as discussed more fully below. The resources (e.g., represented by Weans) exposed to a local federated MBean server (e.g., MBean servers 24, 64, 74) are effectively exposed to all of the federated MBean servers 24, 64, 74, to the extent that they are automatically discoverable by each of the federated MBean servers 24, 64, 74.

For the purposes of the present discussion, an MBean server may be any server that facilitates the registration of and exposure of objects (e.g., MBeans) to clients, where the objects include instrumentation information pertaining to computing environment resources. The clients may be, for example, software applications (e.g., administration software 82 of the administrator system 12) used to manage computing environment resources. The clients may also be, for example, other computing environment resources, e.g., resiliency managers, as discussed more fully in the above-identified and incorporated co-pending U.S. patent application Ser. No. 16/027,100, entitled DYNAMIC RESILIENCY FRAMEWORK, filed on Jul. 3, 2018 (Attorney ref. ORACP0237/ORA180597-US-NP). Note that an MBean server may be a core component of a Java Management eXtensions (JMX) agent, where the hosted MBeans thereof represent probes (accessible to the agent) for computing resources represented thereby.

The first VM (VM1) 14 includes a first federated MBean server 24, with which multiple local MBeans 26, 28 and logical proxied MBeans 30 have been registered. Note that the VMs 14-18 may run on one or more physical servers, e.g., physical computer systems representing application servers and/or web servers.

The first federated MBean server 24 hosts the MBeans 26-30, to the extent that other resources of the administration server 20 on which the first federated MBean server 24 runs may access the MBeans 26-30 via the first federated MBean server 24. The local MBeans 26, 28 (MBean 1a, MBean 1b, etc.) are said to be local to the first VM 14, to the extent that they represent resources hosted by the administration server 20 running in the first VM 14 that also hosts the first federated MBean server 24.

Similarly, MBeans 56, 76 that are hosted by other MBean servers (e.g., servers 40, 70) are called remote MBeans from the perspective of the administration server 20 and accompanying first federated MBean server 24. For example, MBeans that are remote relative to the first administration server 20 include MBean 2a 56 hosted by a second federated MBean server 64 of the managed server 40 running in the second VM 16, and MBean Na 76 hosted by an Nth federated MBean server 74 of the Nth managed server 70 running in the Nth VM 18.

Versions of remote MBeans that have been retrieved for local use represent logical proxied MBeans 30, 60, 80. For example, the proxied MBeans 30 of the first federated MBean server 24 may represent mechanisms by which computing resources included in or communicating with the administration server 20 can access software functionality associated with corresponding remote MBeans, e.g., MBean 2a 56 and/or MBean Na 76. The proxied MBeans 30 may use retrieved connectors (e.g., Remote Method Invocation (RMI)) to facilitate access to (and local use of) the corresponding remote MBeans. Note that the proxied MBeans 30 are called virtual proxies or logical proxies in the sense that they are materialized logically in query results used to discover MBeans.

The first federated MBean server 24 communicates with a first federation module (federation module 1) 32, which enables federation of the first federated MBean server 24 with other federated MBean servers 64, 74 of the system 10, as discussed more fully below. For the purposes of the present discussion, a server is said to be federated with other servers if content (e.g., resource management data and/or functionality) provided by the other servers is readily available to local resources of the server, via the server. Servers that are federated are called participating servers herein, i.e., servers that are participating in a federation.

For the purposes of the present discussion, a federation module may be any software functionality facilitating discovery of remote resources and sharing of resource registration information among servers. The terms "federation module" and "dynamic discovery module" may be employed interchangeably herein.

Note that conventionally, federation of MBean servers of a computing environment involves federation a single MBean server, e.g., an administration server, which can represent a single point of failure. In embodiments discussed herein, each of the servers 14-18 are federated in a peer-to-peer network of federated MBean servers 24, 64, 74; not just the first MBean server 24 running on the administration server 14, as discussed more fully below.

The first example federation module 32 includes a replicated synchronized tree 34, which acts as registry of information (e.g., MBean server information and associated connection information used to connect to the MBean servers) that is shared among other federation modules 52, 82 of the managed servers 40, 70. Each of the servers 20, 40, 70 share respective copies 34, 54, 84 of the tree 34. The replicated tree 34, 84, 84 includes information identifying each of the participating federated MBean servers 64, 74 of the system 10; information describing connectors (which may include copies of the connectors themselves and/or how to obtain, access, or otherwise use the connectors) enabling the different federated MBean servers 24, 64, 74 to connect to each other to interact with (or otherwise obtain access to) remote MBeans, and so on, as discussed more fully below.

The registration information maintained in the tree 34, 54, 84 may be hierarchically structured in accordance with a namespace descriptive of the system 10. The respective federation modules 32, 52, 82 include code for ensuring that any changes to MBean server connection information (including namespace information, e.g., MBean server name) for each MBean server 24, 64, 74 are reflected in the tree 34. The participating servers 24, 64, 74 participate in a federation of peer-to-peer networked MBean servers 24, 64, 74. The tree 34 is said to be synchronized and replicated among the MBean servers 24, 64, 74 and respective application servers 20, 40, 70, as a change in one tree is propagated to the other trees. The trees 34, 54, 84 may be implemented as Java Naming and Directory Interface (JNDI) trees.

For the purposes of the present discussion, a namespace may be any computing object, document, file, or other container used to name and/or otherwise characterize elements and/or associated attributes. A namespace that includes a hierarchical organization of names (e.g., as may be implemented via one or more nested named directories and names of items within the directories) is called a hierarchical namespace herein. A global namespace may be any namespace that is shared by servers of a computing environment.

A tree may be any collection of organized information (e.g., organized in accordance with a structure of a namespace, e.g., a directory structure). The terms "tree" and "directory" may be employed interchangeably herein. Generally, a JNDI tree (also simply called a JNDI) organizes names (and may include additional information) into a hierarchy, thereby representing a namespace. Names can be strings, computing objects that implement name interfaces, etc. Names in the JNDI tree can be bound to computing objects (e.g., MBean server connectors, etc.) in the tree. The computing objects and/or references (or links) thereto may be stored in the tree. Furthermore, additional information, e.g., metadata (including computing object attributes) may be included (or associated with) with each entry in the tree.

Note that embodiments are not limited to use of JNDI trees. The synchronized trees 34, 54, 84 may be implemented via other technologies, such as Apache Zookeeper, without departing from the scope of the present teachings.

Note that collections of computing resources, e.g., computer systems that may intercommunicate via a network of the ecosystem, are called nodes herein. For example, each of the VMs 14, 16, 18, represent nodes. A given node may include software for intercommunicating with other nodes and selectively sharing data, thereby enabling implementation of a peer-to-peer ecosystem.

For the purposes of the present discussion, a peer-to-peer network or ecosystem may be any collection of computing resources, e.g., computer systems and/or software applications, i.e., nodes, which are distributed across a computer network, and which may intercommunicate to facilitate sharing data and/or functionality, e.g., MBeans, process workloads, and so on.

Note that conventionally, peers or nodes of a peer-to-peer network have similar privileges to access data and functionality provided by the network. However, as the term is used herein, peers or nodes of a peer-to-peer network need not be similarly privileged. For example, the first VM 14 hosting the administration server 20 may have additional privileges, beyond the privileges afforded by the remaining VMs 16, 18. The terms "peer-to-peer network" and "peer-to-peer ecosystem" may be employed interchangeably herein.

Note that each of the servers 20, 40, 70 share a similar architecture or framework of federated MBean servers 24, 64, 74 and accompanying federation modules 32, 52, 82. Furthermore, note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings.

For example, in certain implementations, the federation modules 32, 52, 82 may be included in or implemented by the respective MBean servers 24, 64, 74. In other embodiments, the federation modules 32, 52, 82 are implemented as separate federated MBean servers, in which case, for instance, the first MBean server 24 may act as a local server hosting local MBeans 26, 28, while the federation module 32 acts as a federated MBean server hosting or facilitating implementation of logical proxied MBeans 30.

Furthermore, note that while the VMs 14-18 and accompanying application servers 20, 40, 70 are shown including only one respective MBean server 24, 64, 74, that in some implementations, each server 20, 40, 70 may host plural MBean servers, which may communicate with the local federated MBean servers 24, 64, 74 to obtain access to remote MBeans hosted by other MBean servers running on different VMs.

Generally, when new servers and associated VMs are added to the system 10, the accompanying new MBean servers join the federation by using their respective federation modules to obtain a copy of the tree 34, 54, 84 and registering with the tree. Registration with the tree 34 involves updating the tree with information allowing other MBean servers 24, 64, 74 of the federation to connect to and query available MBeans; obtain requisite connectors for the MBeans, and so on. Similarly, servers that are taken offline may deregister with the tree, or otherwise may be automatically deregistered if they become nonresponsive.

Accordingly, the system 10 may readily grow to accommodate new servers, or contract as needed when servers are removed or otherwise go offline. In this way, the system 10 is said to be dynamic and scalable. Communications between the federation modules 32, 52, 82 are said to be loosely coupled or minimally coupled (and not hard coded), to the extent that different federation modules 32, 52, 82 and associated MBean servers 24, 64, 74 can readily go offline without substantially negatively impacting or compromising functionality of the remaining running components, and new federation modules may be added without substantially impacting the functionality of other modules. The federation modules 32, 52, 82 and associated MBean servers 24, 64, 74 may use simple push and pull methods for intercommunicating as needed to meet the needs of a given implementation or scenario.

Note that a software application connecting with a given MBean server uses a connector that is compatible with connections to the MBean server. Different MBean servers may use different types of connectors. Examples of connector types include Remote Method Invocation (RMI) connectors, HyperText Transfer Protocol (HTTP) connectors, Simple Object Access Protocol (SOAP) connectors, and so on. The term "connector" is used broadly herein and may also refer to software adaptors, e.g., Simple Network Management Protocol (SNMP) adaptors, HyperText Markup Language (HTML) adaptors (e.g., for web browsers connecting to MBean servers), etc. The exact types of connectors used are implementation specific and may vary depending upon the needs of a given implementation, without departing from the scope of the present teachings. In general, a connector may be any mechanism or method (e.g., implementing or enforcing a protocol) facilitating communications between computing environment components or resources, e.g., processes, such as by selectively converting transmitted data between forms or representations.

A client software application, e.g., client-side administrator software 82 (e.g., a Java Management eXtensions (JMX) console application and accompanying User Interface (UI)) running on the administrator system 12, may connect to any of the federated MBean servers 24, 64, 74 (using respective connectors 22, 42, 72 for those servers 24, 64, 74) to access data and/or functionality afforded by any of the MBeans 26, 28, 56, 76 of the system 10.

In an example scenario, the administrator software 82 passes a query (which includes search criteria) for specific MBeans to the first federated MBean server 24 via a first connector 22. The first federated MBean server 24 then searches the local MBeans 26, 28 for MBeans matching the query (i.e., matching the search criteria) and also accesses the federation module 32 and accompanying synchronized tree 34 to find any remote MBeans matching the query. Results of the search, indicating all MBeans found in the system 10 (matching the query from the administrator software 82) are then returned to the administrator software 82. The client-side administrator software 82 may then display the query results in a JMX console, browser, and/or other Graphical User Interface (GUI).

To then use data and/or functionality of an MBean indicated/shown among search results, the administrator software 82 may then issue a signal (e.g., responsive to user input) via the first connector 22 to the first MBean server 24 to retrieve or otherwise access data and/or functionality of the discovered MBean (e.g., metrics and resource instrumentation functionality). If the MBean is a remote MBean, e.g., an MBean 56, 76 hosted by another federated MBean server 64, 74 (other than the first federated MBean server 24 to which the administrator software 82 is connected), then the federated MBean server 24 may reference the federation module 32 to determine the type of connector used by the remote MBean server hosting the MBean to be accessed by the administrator software 82. Functionality for use of the connector type may be retrieved for local use from the synchronized tree 34 (or via a link included in the tree) with which the connector information has been registered in association with the sought MBean and associated MBean server.

The federated MBean server 24 may then employ the retrieved connector to virtually retrieve the sought remote MBean for local use by the local federated MBean server 24. Note that a remote MBean is said to be retrieved for local use by the first federated MBean server 24 if the remote MBean or version thereof or functionality associated therewith is registered for use with the first federated MBean server 24. In the present example embodiment, retrieved remote MBeans are represented locally as logical proxied MBeans 30 (also called virtual proxied MBeans). The proxied MBeans 30 may employ connectors to communicate with remote MBeans and provide data and functionality of the remote MBeans locally to computing resources (e.g., the administrator software 82) of the administration server 20.

Note that while, in the present example scenario, client-side administrator software 82 is discussed as selectively querying, referencing, and using any MBeans 26, 28, 56, 76, 30, 60, 80, that embodiments are not limited thereto. For example, other software applications (not just administrator software) running on the local administration server 20 or other client machines and accompanying software in communication with the federated MBean server 24 may query and use subsequently retrieved MBeans, without departing from the scope of the present teachings.

For example, each of the servers 20, 40, 70 may host resiliency managers (in communication with metrics managers), which may selectively access the federated MBean servers 24, 64, 74 to obtain or use associated instrumentation data and/or functionality. Examples of data that can be retrieved from an MBean include metrics and status information pertaining to or otherwise applicable to the operation of one or more resources represented by the MBean.

For the purposes of the present discussion, a metric may be any measured or sensed value descriptive of a quality, property, of something (i.e., anything in a computing environment that can be monitored), e.g., a resource, in a computing environment. For example, one metric may be a measurement of disc space used by a particular database resource. Another example metric includes a throughput measurement of a communications link, e.g., measuring the input data rate as a function of the data-rate capacity of the link.

A metrics manager may be any code, object, or other mechanism in a computing environment that is adapted to use a metric to set state or status information (e.g., to set a quiesced status, an unquiesced status, a warning status, etc.) for a computing resource or a thing being measured by the metric, and to generate a signal to initiate a remediation action (or otherwise cause implementation of the remediation action).

A resiliency manager may be any code, object, or other mechanism in a computing environment that is adapted to discover one or more resources and metrics managers and to facilitate communications and/or sharing of information (e.g., status information, metrics, etc.) between one or more resources and one or more associated metrics managers. Metrics managers and resiliency managers are discussed more fully in the above-identified and incorporated co-pending U.S. Patent Application Ser. No. 16/027,100, entitled DYNAMIC RESILIENCY FRAMEWORK, filed on Jul. 3, 2018 (Attorney ref. ORACP0237/ORA180597-US-NP).

Examples of functionality that may be associated with a particular MBean include the triggering of a remediation action on a computing resource. For the purposes of the present discussion, a remediation action may he any software action for implementing an adjustment to an entity in the computing environment, e.g., resource, to mitigate or eliminate a condition, challenge, or problem. For example, if a database resource is filling up (with data) to capacity (which represents an adverse condition), an associated remediation action may include running a purge operation on the database, e.g., to free up space used by the database.

Generally, a software action may be any process or collection of processes or operations implemented via software. Additional examples of processes include updating or editing data in a database, triggering a sequence of processes, implementing a database backup operation, and so on.

Software functionality may be any function, capability, or feature, e.g., stored or arranged data, that is provided via computer code, i.e., software. Generally, software functionality may include actions, such as retrieving data pertaining to a computing object (e.g., business object); performing an enterprise-related task, such as promoting, hiring, and firing enterprise personnel, placing orders, calculating analytics, launching certain dialog boxes, performing searches, and so on. Software management functionality may be any software functionality and/or data usable to monitor characteristics (e.g., metrics, health status, etc.) of a computing resource and/or to otherwise implement or initiate software actions (e.g., remediation actions) related to or associated with the computing resource.

Furthermore, note that while the present example scenario is discussed with reference to the client-side administrator 82 communicating with the administration server 20 and accompanying first federated MBean server 24 to conduct an MBean query and to use subsequently found MBeans, scenarios are not limited thereto. The administrator software 82 may access any of the federated MBean servers 24, 64, 74 to implement an MBean query, which may result in a search of all available MBeans of the system 10. The search results, including subsequently discovered MBeans and their data and/or functionality, are then available to the administrator software 82, either directly (e.g., if the discovered MBeans are local), and/or via proxy, e.g., virtual proxy.

Note that the federation modules 32, 52, 82 of the system 10 share information among each other in a peer-to-peer fashion and via loose coupling (i.e., not hard-coded tight coupling). Some shared information (e.g., MBean server name and other connection information) is maintained in replicated trees 34, 54, 84, where changes in any of the trees 34, 54, 84 are propagated to the other trees, such that the trees 34, 54, 84 generally represent copies of each other. In this way, the trees 34, 54, 84 may act as distributed directories characterized by information that is organized in accordance with a global namespace that organizes names of various components (e.g., MBean servers 24, 64, 74). The directory or tree may also include additional information, i.e., not just names, such as metadata and computing objects and associated code or references to other code, e.g., connectors.

Figure 2:
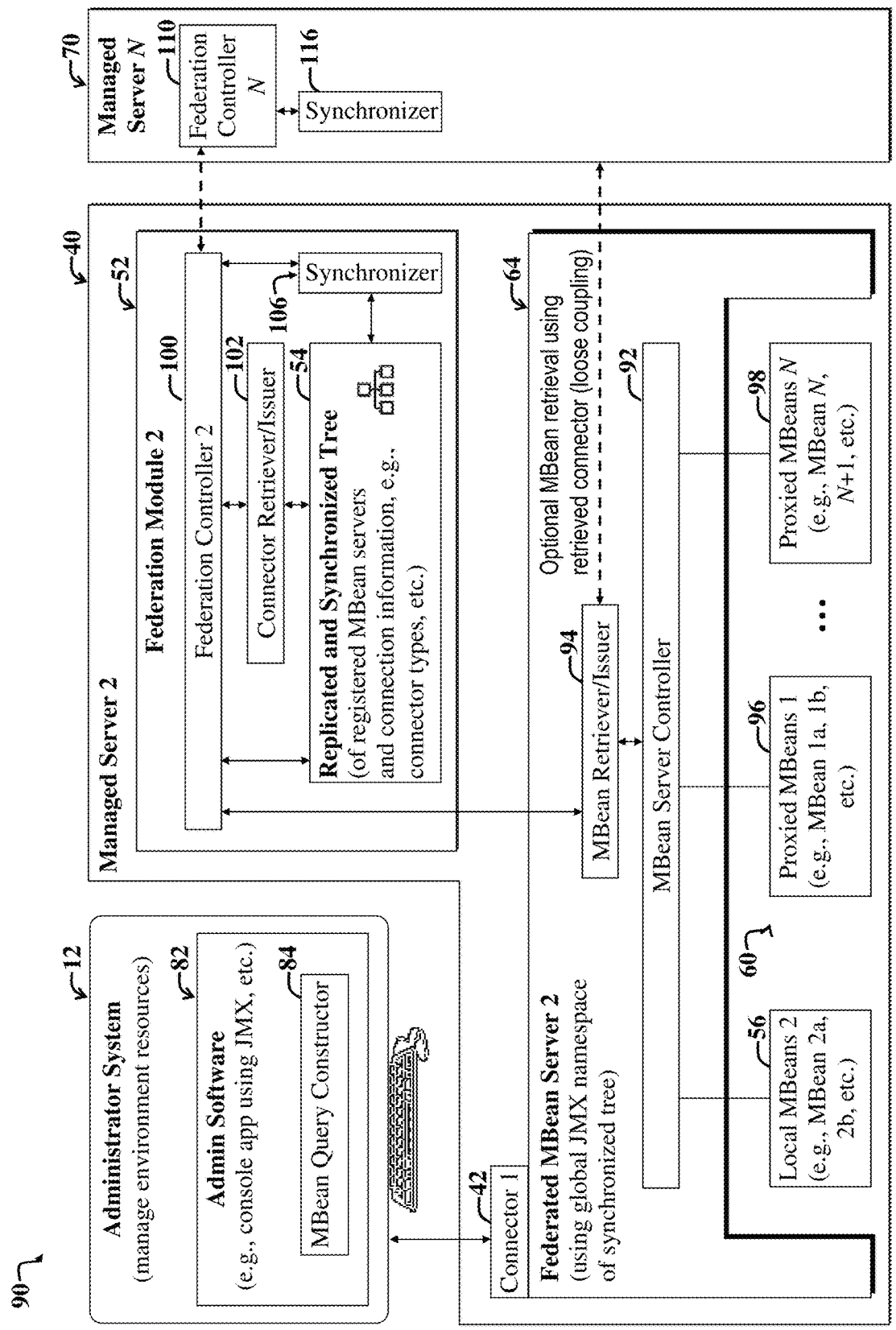
FIG. 2 is a second block diagram of an illustrative embodiment, implementing a version of the framework of FIG. 1 in a computing environment, and showing example details of a federation module used to federate a Managed Bean (MBean) server.

FIG. 2 is a second block diagram of an illustrative embodiment, implementing a version 90 of the framework and accompanying system of FIG. 1 in a computing environment, and showing example details of federation module 52 used to federate the associated MBean server 64.

The illustrative system 90 illustrates additional detail (relative to FIG. 1) of an example implementation of the second managed server 40 and accompanying federation module 52 of FIG. 1. Note that the other servers 20, 18 of the system 10 of FIG. 1 may be implemented similarly to the second managed server 40 shown in FIG. 2, as it pertains to implementation of a federated MBean server 64 and accompanying federation module 52.

The example second federated MBean server 64 of the second managed server 40 includes an MBean server controller 92 in communication with hosted MBeans 56, 96, 98, including local MBeans 56 and logical proxied MBeans 60. The example logical proxied MBeans 60 include first proxied MBeans 96 (representing virtual proxies of the MBeans 26, 28 of the administration server 20 FIG. 1) and second proxied MBeans 98 (representing proxies of the MBeans 76 of the Nth managed server 70 of FIG. 1).

The MBean server controller 92 includes code for handling client requests (e.g., requests from the client-side administration software 82 and/or other computing environment components) and queries for local MBeans 56 and logical proxied MBeans 60 hosted by the second federated MBean server 64. The MBean server controller 92 further includes code for communicating with the second federation module 52, e.g., via an MBean retriever and/or issuer module 94. The MBean retriever and/or issuer 94 may also execute queries of other remote MBean servers (via signaling with a federation controller module 100) using the replicated and synchronized tree 54 of the second federation module 52, e.g., in response to other queries received by the MBean server controller 92, e.g., via the client-side administration software 82 or other computing environment processes or resources.

The example second federation module 52 includes a federation controller 100 in communication with the replicated and synchronized tree 54 and an MBean server connector retriever and/or issuer 102. The MBean server connector and/or issuer 102 further has access, i.e., communicates with, the replicated and synchronized tree 54. The replicated and synchronized tree 54 communicates with a local synchronizer 106, which also communicates with the federation controller 100. Note that the tree 54 need not maintain an entire MBean tree for the computing environment, but instead may maintain MBean server information (e.g., names, etc.) and connector information, enabling the routing of queries to the appropriate MBean servers (in accordance with criteria specified in the queries), where each MBean server may maintain a searchable tree of their own locally hosted MBeans, as discussed more fully below. Accordingly, the tree 54 is not to be confused with a conventional MBean tree maintained by a conventional MBean server.

The example federation controller 100 includes code for facilitating communications between various modules 54, 102, 106 of the federation controller 100 and selectively routing communications therebetween. The federation controller 100 also includes code for communicating with and implementing software actions in response to communications with the MBean retriever and/or issuer 94, in addition to software actions responsive to communications with other federation controllers of other servers, e.g., the Nth federation controller 110 of the Nth managed server 70 and accompanying Nth synchronizer 116. The synchronizers 106, 116 include code for ensuring that server connection information maintained by or registered in the replicated and synchronized tree 54 remains current with server connection information maintained in other trees of other servers that are participants in the same federation of MBean servers.

Accordingly, the synchronizer modules 106, 116 need not be used to synchronize a global MBean tree per se, i.e., a tree indicating all registered MBeans of the system 90. Instead, the tree 54 need only maintain server connection information to facilitate the routing of and implementation of queries. For the purposes of the present discussion, the connection information may be any information enabling each query to be delegated to the appropriate MBean server based on the query. For instance, a generic query with no server location information will be delegated to all remote MBean servers/connectors, while a query targeted at a particular MBean server/connector instance will only be delegated to that particular remote MBean server (via the associated connector).

For example, to discover all the MBeans of type MetricManager a query could be issued with an ObjectName pattern of the form: *:type=MetricManager,*. Such a query returns all of the MBeans of type MetricManager regardless where (i.e., on which server) they are registered. For instance, the query might return:

Xyz.ics:type=MetricManager, subType=DBAllocatedSpace, Location=server1
Xyz.ics:type=MetricManager, subType=DBAllocatedSpace, Location=server2
Xyz.ics:type=MetricManager, subType=MemoreAllocation, Location=server1

Now, given a query with an ObjectName pattern such as: *Xyz.ics:type=MetricManager, Location=server1,* the query will only be delegated to the connector associated with Server1. Hence, the result would not include an MBean form another server other than Server1, i.e., the results will be from a search of Server1.

Accordingly, the tree 54 need not be a complete MBean tree and need only contain server connection information (e.g., connector types, connectors or references thereto, MBean server metadata, e.g., server name, etc.). This obviates the need to maintain a large synchronized copy of an MBean tree for the entire system 90 on each VM. By maintaining primarily connection information in the tree 54, without the need to maintain listings of registered MBeans replicated on each VM, this may efficiently enable enhanced scalability as the system 90 grows. Hence, in essence, resources (represented by MBeans) can be lazily discovered when queries are issued.

In an example scenario, an administrator using the administrator system 12 enters a query for one or more MBeans using the administration software 82. The query includes one or more search criteria pertaining to MBeans sought for use by the administrator. The administrator software 82 includes an MBean query constructor module 84 that is usable by an administrator to specify one or more MBean search criteria and generating an MBean query in response thereto. The MBean query is then sent to the second federated MBean server 64 via a connection therewith established via the first connector 42.

The MBean server controller 92 then uses the query to search for MBeans matching the search criteria of the query. The MBean server controller 92 then searches MBeans hosted thereby for MBeans matching the search criteria of the query. If any local MBeans 56 match the search criteria, they are collected for subsequent presentation to the client-side administration software responsive to the query.

However, the MBean server controller 92 may then also use the second federation module 52, via the MBean retriever and/or issuer 94 to search for (and discover) any remote MBeans matching the query criteria. Accordingly, the MBean retriever and/or issuer 94 then initiates a search using query parameters (e.g., parameters that may or may not identify a particular server to search) and MBean servers and associated connection information registered in the replicated and synchronized tree 54. The search is effectuated by the MBean retriever and/or issuer 94 and the federation controller 100 of the federation module 52.

Recall that MBeans need not be registered in the replicated and synchronized tree 54, but server connection information for other MBean servers in the federation is registered in the tree 54. The server connection information enables queries to be issued to MBean servers participating in the federation. If MBeans hosted by remote MBean servers match the query search criteria, then information describing the matching MBeans may be retrieved to the MBean server controller 92. In this way, the query is delegated to the associated connector/adaptor for each MBean server to be searched for MBeans matching the query. Note that, in response to a query, certain embodiments may retrieve not only descriptions of the matching MBeans, but data and/or functionality associated therewith for local use. Alternatively, the data and/or functionality of the MBeans matching the query criteria are only made available upon subsequent requests (after descriptions of matching MBeans are retrieved) to access the data and functionality by the requesting client, e.g., the client-side administrator software 82.

Note that to retrieve data and/or functionality of a remote MBean (e.g., an MBean of the Nth managed server 70) for local use by local computing resources of the second managed server 40, the managed server 40 first obtains a computing object and/or other code (i.e., a connector) for implementing a communications connection with the Nth managed server 70 and associated Nth MBean server (the Nth MBean server 74 of which is shown in FIG. 1, but omitted from FIG. 2 for clarity). The connector may be obtained from the replicated and synchronized tree 54 via the connector retriever and/or issuer 102 and accompanying replicated and synchronized tree 54 of the federation module 52.

Once an appropriate connector (for communicating with an MBean server hosting the sought MBean) is retrieved for local use, e.g., via data and/or functionality (e.g., code and associated computing objects) stored in (or referenced by) the replicated and synchronized tree 54, the retrieved connector can then be used by the MBean retriever and/or issuer 94 to connect to and/or otherwise discover and virtually retrieve the associated MBeans from the remote server, e.g., the Nth managed server 70. The connection may occur more directly between the MBean retriever and/or issuer 94 and the other managed server 70 and/or more indirectly through the federation module 52.

Note that the illustrative example system 90 supports multiple operative scenarios, including a scenario whereby remote MBeans are selectively retrieved for local use (e.g., via locally created corresponding logical proxied MBeans 60) via the MBean retriever and/or issuer 94 of the federated MBean server 64, and another scenario, whereby MBeans are retrieved (e.g., from the remote managed Nth server 70) for local use by the MBean retriever and/or issuer 94 via the federation controller 100, which then retrieves the MBeans (virtually) via loose coupling with the Nth federation controller 110 (and/or other federation controllers of other servers of the computing environment).

Figure 3:
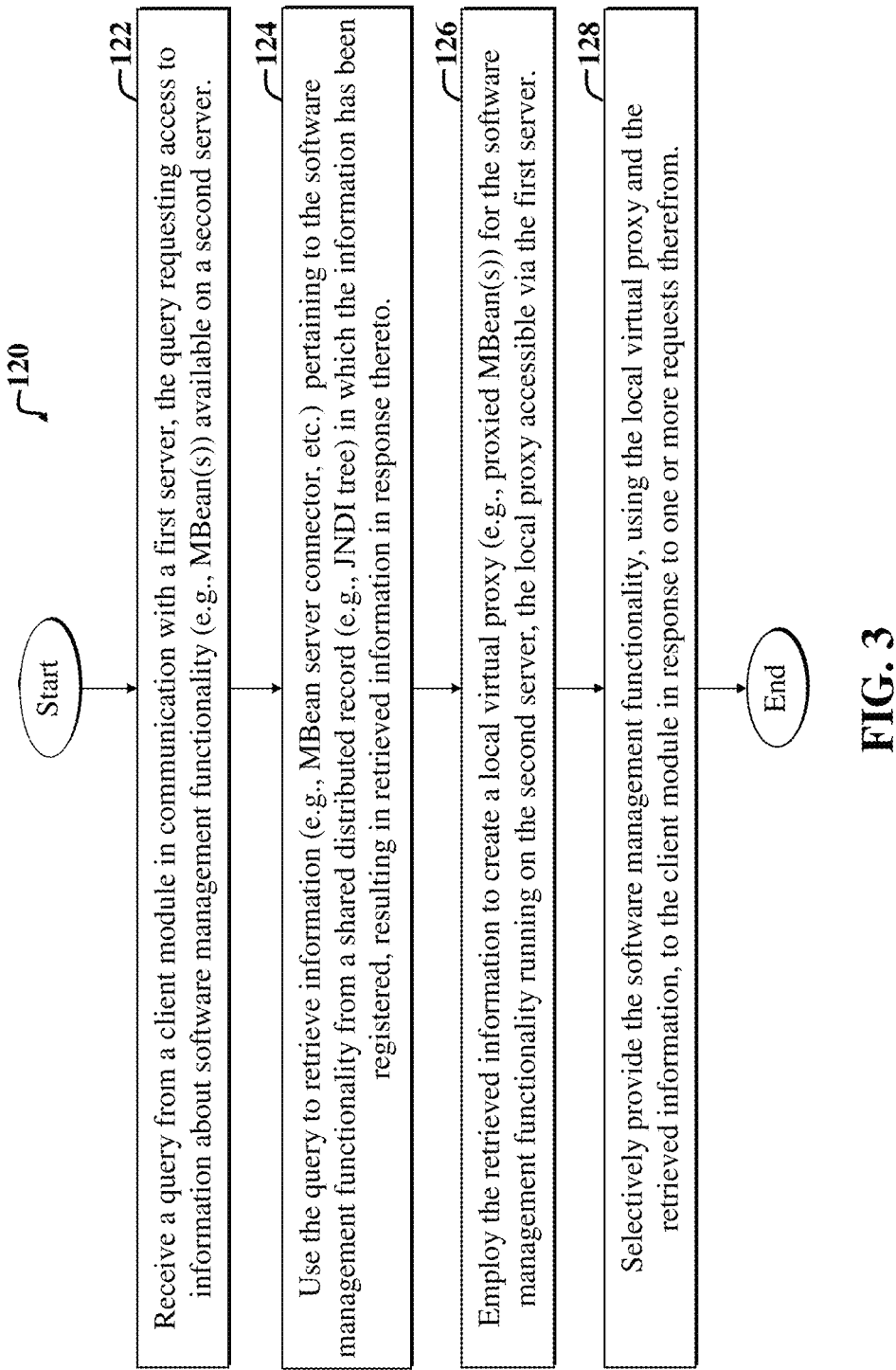
FIG. 3 is a first flow diagram of a first example method implementable via the embodiments of FIGS. 1-2.

FIG. 3 is a first flow diagram of a first example method 110 implementable via the embodiments of FIGS. 1-2. The first example method facilitates selectively sharing software management data and/or functionality (e.g., as afforded by MBeans, MBean servers, etc.) among components (e.g., computing resources, such as administrator software) of a computing environment.

Note that in the following discussion, references to "first server" and "second server" need not directly correspond to the first administration server 20 of FIG. 1 and the second managed server 40 of FIG. 1 and FIG. 2. For the purposes of the following discussion, the first server is taken to be the local server (which can be, for example, any of the servers 20, 24, 40, 64, 70, 74, of FIG. 1), and the second server is taken to be another server, i.e., a remote server (relative to the first server) from which MBean data and/or functionality is to be accessed or used by one or more resources in communication with the first server or local thereto. Furthermore, depending upon the context in which the term (server) is used, the server may refer to an MBean server, an application server on which the MBean server runs, the VM hosting the application server, the physical server hosting the VM, or a combination thereof.

The first example method 120, from the perspective of a federated MBean server (e.g., the second federated MBean server 64 of FIGS. 1 and 2) includes an initial query-receiving step 112. The query-receiving step 112, involves receiving a query from a client module (e.g., the administration software 82 of FIG. 20 in communication with a first server (e.g., the managed server 40 and accompanying second federated MBean server 64 of FIG. 2), the query requesting access to information about software management functionality (e.g., MBeans, MBean servers, etc.) available on a second server (e.g., the Nth managed server 70 of FIG. 2).

Subsequently, a query-using step 124 includes using the query to retrieve information (e.g. remote MBean server identification information, connector information, etc.) pertaining to the software management functionality from a shared distributed record (e.g., a replicated, synchronized, and distributed JNDI tree 54 of FIG. 2), wherein the information has been registered in the shared distributed record, resulting in retrieved information (e.g., MBean server name and connector information) in response thereto.

Next, an information-employing step 126 includes employing the retrieved information to create a local virtual proxy (e.g., one or more of the proxied MBeans 96, 98 of FIG. 2) for the software management functionality running on the second server (e.g., the Nth server 70 of FIGS. 1 and 2), the local virtual proxy running on (or maintained on) the first server (e.g., the second managed server 40 of FIG. 1). Note that the local proxy for an MBean need not be a physical proxy for the MBean. Generally, in the present example embodiment, proxied MBeans are virtual proxies. A virtual proxy may be a proxy that is only materialized logically among query results used to discover MBeans. The terms "virtual proxy" and "logical proxy" are used interchangeably herein. Then, when the logical MBean proxy (also called logical or virtual proxied MBean) is accessed, for instance, to invoke an operation or retrieve a value associated with an MBean attribute, the call is directly delegated to the appropriate connector (of the MBean server hosting the sought MBean) and addressed to the proper physical MBean there.

Finally, a functionality-using step 128 includes selectively using the local proxy and the retrieved information to provide the software management functionality functionality afforded by one or more remote MBeans and accompanying MBean server) to the client module (e.g., the administrator software 82 of FIG. 2) in response to one or more requests therefrom.

Note that the method 120 may be modified, without departing from the scope of the present teachings. For example, the first example method 120 may further specify that the retrieved information includes a connector for enabling connecting to software management functionality specified in the query, where the connector includes code for connecting to the software management functionality.

The first example method 120 may further specify that the software management functionality is implemented via one or more computing resources that are exposed as one or more second Managed Beans (MBeans) hosted by an MBean server on the second server (e.g., the Nth server 70 of FIGS. 1 and 2), wherein the one or more MBeans are local to the second server.

The information-employing step 126 may further include using the retrieved information to generate one or more logical proxied MBeans on the first server for the one or more MBeans, and using one or more connectors specified via the retrieved information to facilitate using the one or more proxied MBeans to access data and/or functionality of the one or more MBeans.

The first server may include a first application server (e.g., the administration server 20 of FIG. 1) running in or hosting a first VM (e.g., the VM 14 of FIG. 1), and the second server may include a second application server running in or hosting a second VM. The first VM and the second VM are part of a similar server cluster that includes plural servers (e.g., servers 20, 40, 70 of the server domain of the system 10 of FIG. 1) that are part of an administrative domain (e.g., as administered via the administration server 20 of FIG. 1).

The administrative domain is federated via code running one or more federation modules (e.g., the modules 32, 52, 82) in communication with one or more replicated global namespaces (e.g., implemented via the replicated synchronized trees 34, 54, 84 of FIG. 1). The one or more replicated global namespaces include a name hierarchy on each of the plural servers. The content of the name hierarchy is replicated, synchronized, and shared among the plural servers.

The global namespace may be implemented, at least in part, via a JNDI tree, Apache Zookeeper, or other suitable technology. The namespace is said to he global, as it is shared by all of the servers 20, 40, 70, which adhere to the associated naming convention of the namespace.

The software functionality may include, for example, one or more computing objects, wherein the one or more computing objects includes an MBean. Each of the plural servers includes one or more federated MBean servers (e.g., the federated MBean servers 24, 64, 74 of FIG. 1).

Figure 4:
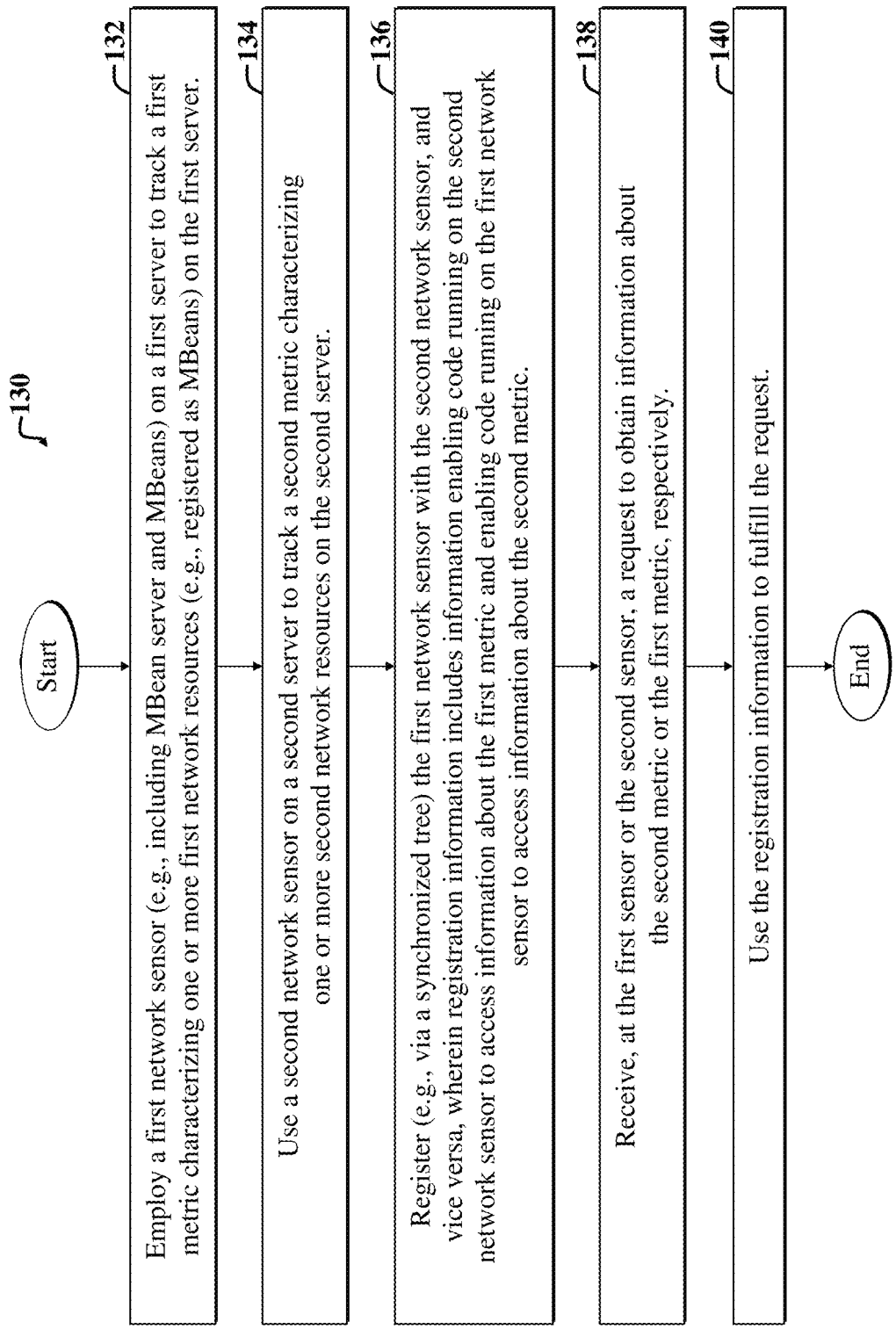
FIG. 4 is a second flow diagram of a second example method implementable via the embodiments of FIGS. 1-2.

FIG. 4 is a second flow diagram of a second example method 130 that is implementable via the embodiments of FIGS. 1-2. The second example method 130 facilitates monitoring resources of a computing environment and accompanying network.

A first step 132 includes employing a first network sensor (e.g., MBeans 26, 28 and accompanying MBean server 24 of FIG. 1) on a first server (e.g., the administration server 20 of FIG. 1) to track a first metric characterizing one or more first network resources (e.g., as may be registered as MBeans) on the first server. For the purposes of the present discussion, a network sensor may be any functionality for measuring one or more metrics or otherwise sensing one or more conditions of one or more computing environment resources and providing or storing the measured or sensed information in response thereto, wherein the computing environment includes a network, e.g., is a networked computing environment.

A second step 134 includes using a second network sensor (e.g., one or more MBeans 56 and second MBean server 64 of FIG. 1) on a second server (e.g., the managed server 40 of FIG. 1) to track a second metric characterizing one or more second network resources on the second server.

A third step 136 includes registering the first network sensor with the second network sensor, and vice versa. Registering may include supplying registration information (e.g., name and connection information) to a local replicated synchronized tree (e.g., the trees 34, 54 of FIG. 1). The registration information (e.g., MBean server name, suitable connectors and connector types, etc.) includes information enabling code running on the second sensor to access information about the first metric and enabling code running on the first sensor to access information about the second metric (e.g., via the creation of proxied MBeans).

A fourth step 138 includes receiving, at the first sensor or the second sensor a request to obtain information about the second metric or the first metric, respectively. The request, for example, may include a query from the federated MBean server 24 or 64 of FIG. 1, where the query may have been initiated via client-side administrator software 82 of FIG. 1.

A fifth step 140 includes using the registration information to fulfill the request, e.g., by creation of and use of subsequently proxied MBeans.

Note that the second example method 130 may be altered, without departing from the scope of the present teachings. For example, the method 130 may further specify use of a tree (e.g., JNDI tree) to store the registration information, and selectively updating the registration information responsive to detection of one or more changes to one or more of the first network resources or second network resources.

The third step 136 may further include synchronizing a resource tree (e.g., the trees 34, 54 of FIG. 1) between the first network sensor and the second network sensor. The resource tree includes connection information enabling discovery of resources on the first server and discovery of resources on the second server (e.g., MBeans hosted thereby or local thereto).

The second example method 130 may further specify that the first network sensor includes one or more first MBeans (e.g., the MBeans 26, 28 of FIG. 1) accessible to a first MBean server (e.g., the first federated MBean server 24 of FIG. 1) running on the first server (e.g., the administration server 20 of FIG. 1); wherein the second network sensor includes one or more second MBeans (e.g., the MBeans 56 of FIG. 1) accessible to a second MBean server (e.g., the second federated MBean server 64 of FIG. 1) running on the second server (e.g., the second managed server 40 of FIG. 1).

The first MBean server and the second MBean server are federated, thereby collectively representing a federated MBean server domain. The federated MBean server domain may represent a new type of JMX federated MBean server domain, e.g., to the extent that Java Management eXtensions (JMX) tools may be used to facilitate implementation and use of the federation of MBean servers.

The second example method 130 may further include establishing a common session between all MBean servers of the federated MBean upon initial user login to one or more of the first MBean server and the second MBean server. The first server and the second server comprise (or be a part of) a common server cluster or server domain.

Accordingly, the second example method 130 may involve use of a distributed JNDI tree to discover remote connectors corresponding to available MBean servers. The federated MBean servers are aware of and communicate with the federated JNDI tree and monitor new entries being added or removed to the JNDI tree. Registration information in the JNDI tree is usable (e.g., by other network resources) to facilitate monitoring health status of existing entries, and entries may be removed if necessary, e.g., if they are no longer applicable for use by resources of the computing environment.

Accordingly, certain embodiments discussed herein facilitate implementing a distributed peer-to-peer network of resource-status sensing systems. The sensing systems include dynamic discovery modules (e.g., federation modules and associated federated MBean servers) for accessing sensed states of one or more other servers of the peer-to-peer network. JMX technologies may facilitate communications between nodes of the sensing system. Each node of the peer-to-peer network includes one or more MBean servers.

The loose coupling or minimal coupling of the MBean servers of the peer-to-peer network help to ensure dynamic scalability of the network, while removing reliance upon a centralized administration server to provide a view (e.g., to administrator software) of overall network resources, such that the conventional "single point of failure" is removed.

In response to a query (e.g., from client-side administrator software), a federated MBean server may access the synchronized tree; obtain one or more connectors for one or more MBean servers matching the query; run the query; retrieve MBeans matching the query; translate the object name (e.g., MBean names) using the global namespace implemented via the tree; create a local virtual proxy (also called logical proxy, as discussed above) for the object (e.g., MBean); then provide access to data and/or functionality of the MBean to the requesting software (e.g., client-side administrator software).

An alternative example method for facilitating access to information characterizing computing resources in a networked computing environment includes: receiving a request from a client device, the request querying information about computing resources connected to the network; selectively accessing local information (e.g., provided by local MBeans) characterizing local computing resources responsive to the query; using a distributed synchronized log (e.g., the replicated and synchronized tree 34, 54, 74 of FIG. 1) describing other remote resources coupled to the network to retrieve one or more connectors for one or more remote computing resources matching the query; employing the one or more connectors to automatically connect to the one or more remote computing resources, thereby resulting in a connection; using the connection to retrieve descriptive information characterizing the one or more remote computing resources, thereby resulting in retrieved information; and maintaining the retrieved information and the local information locally for use by one or more computing resources running locally.

Note that a given MBean server may access the tree in response to query for MBean of a given type. The MBean server may obtain the connector (to connect to another MBean server) connector based on what is returned from the tree. The MBean server may then communicates with the other MBean servers to discover and virtually retrieve the MBeans of a specific type. Locally retrieved MBeans may act as local virtual or logical proxies, which can then be manipulated by or otherwise used by client software, e.g., the administrator software 82 of FIGS. 1 and 2.

Accordingly, each server of a given cluster may run a local MBean server. The local MBean server maintains or otherwise communicates with a distributed tree, which is synchronized with other MBean servers (and/or associated federation modules) in the same application server cluster. Use of the distributed tree facilitates discovery of exposed resources of the application servers throughout the cluster from any local MBean server running on any of the application servers of the cluster. Each local MBean server references the replicated tree to facilitate discovering exposed resources.

Another example method implements a distributed resource system and involves performing the following acts via a federated server: receiving a query from a requesting system asking for one or more other resources exposed on the network; parsing the query using the federated server to determine which connector(s) registered in a federated lookup server module (e.g., federation module) to retrieve, wherein the federated lookup server module is replicated on each requesting system; obtaining one or more connectors for the query; using the one or more connectors and the federated lookup server module (implementing a global namespace) to retrieve the one or more networked resources and information on the status of the one or more networked resources; and returning the resulting networked resources to the requesting system or process.

Figure 5:
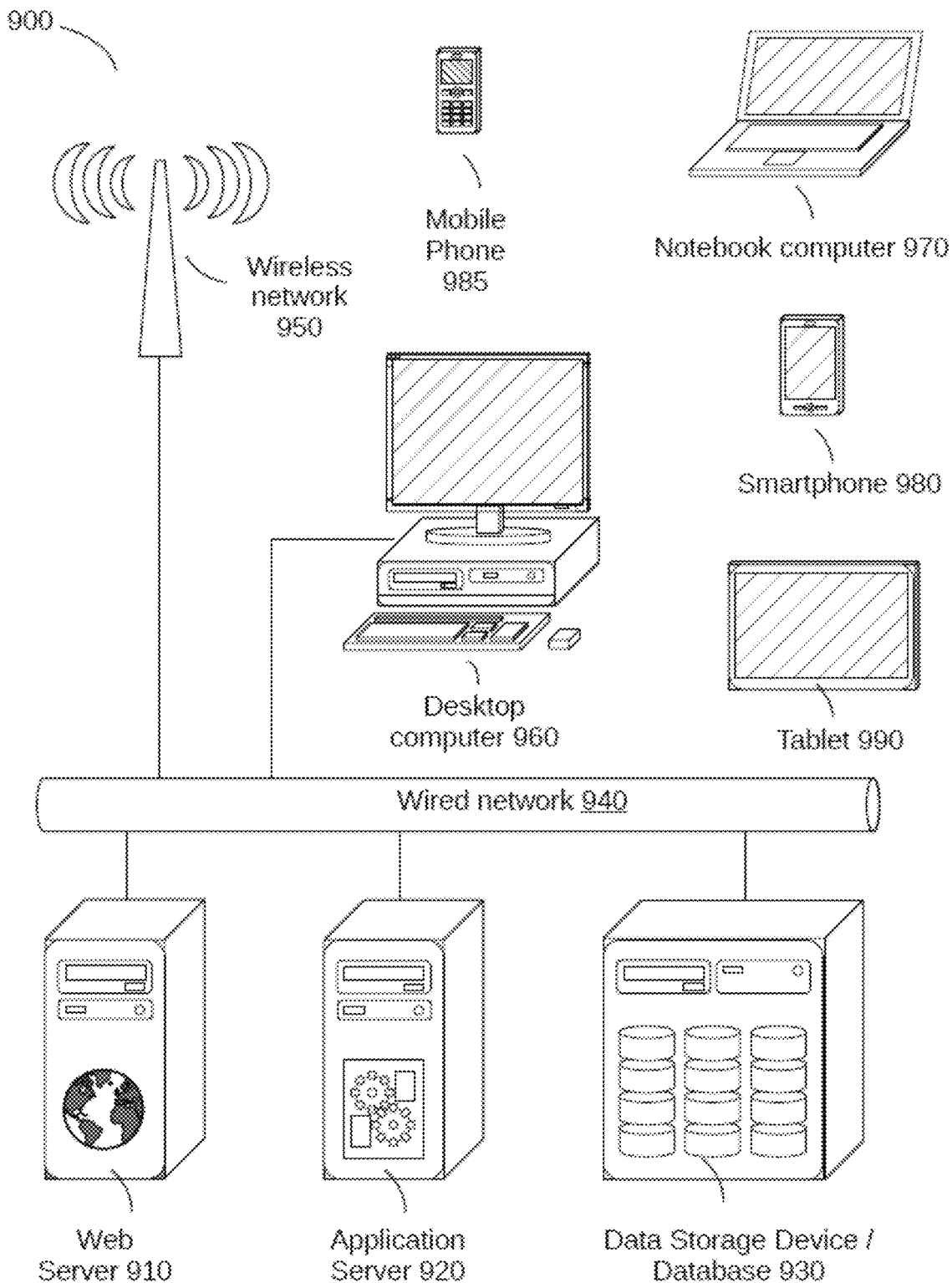
FIG. 5 is a general block diagram of a system and accompanying computing environment usable to implement the embodiments of FIGS. 1-2.

FIG. 5 is a general block diagram of a system 900 and accompanying computing environment usable to implement the embodiments of FIGS. 1-2. The example system 900 is capable of implementing the example computing environments 10 of FIG. 1 and 90 of FIG. 2 and accompanying methods 120, 130 of FIGS. 3 and 4. Embodiments may be implemented using standalone applications (for example, residing in a user device) and/or using web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C #, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data, from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

With reference to FIGS. 2 and 5, the administrator system 12 may be implemented via one or more of the user computers 960-990 of FIG. 5. The managed servers 40, 70 may be implemented via one or more of the application server(s) 920 of FIG. 5. The web server 910 of FIG. 5 may be implemented between the second managed server 40 and administrator system 12 of FIG. 2, and used to serve UI content to the administrator system 12 of FIG. 2.

With reference to FIGS. 1 and 5, the VMs 14-18 may be run on one or more application servers, e.g., the application server 920 of FIG. 5. Local MBeans 26, 28, 56, 76; proxied resources 30, 60, 80; and the replicated synchronized tree 34, 54, 84 may be maintained in storage, e.g., the data storage device 930 of FIG. 5. Note that the data storage device 930 of FIG. 5 may also be exposed as a resource to the accompanying computing environment 900 by registering an MBean for the data storage device 930 with an MBean server (e.g., one or more of the federated MBean servers 24, 64, 74 of FIG. 2) of the application server 920.

Note that in certain implementations, the client administrator system 12 of FIGS. 1 and 2 may selectively access (in accordance with the their permissions) computing environment resources hosted by the VMs 14-18 of FIG. 1 by first browsing to a website that provides one or more web pages with UI controls to access the resources (e.g., functionality provided by the federated MBean servers 24, 64, 74). Such a web site may be hosted on the web server 910 of FIG. 5, which may communicate with the application server 920 to implement software actions in accordance with user interaction with the web page and accompanying UI controls.

Figure 6:
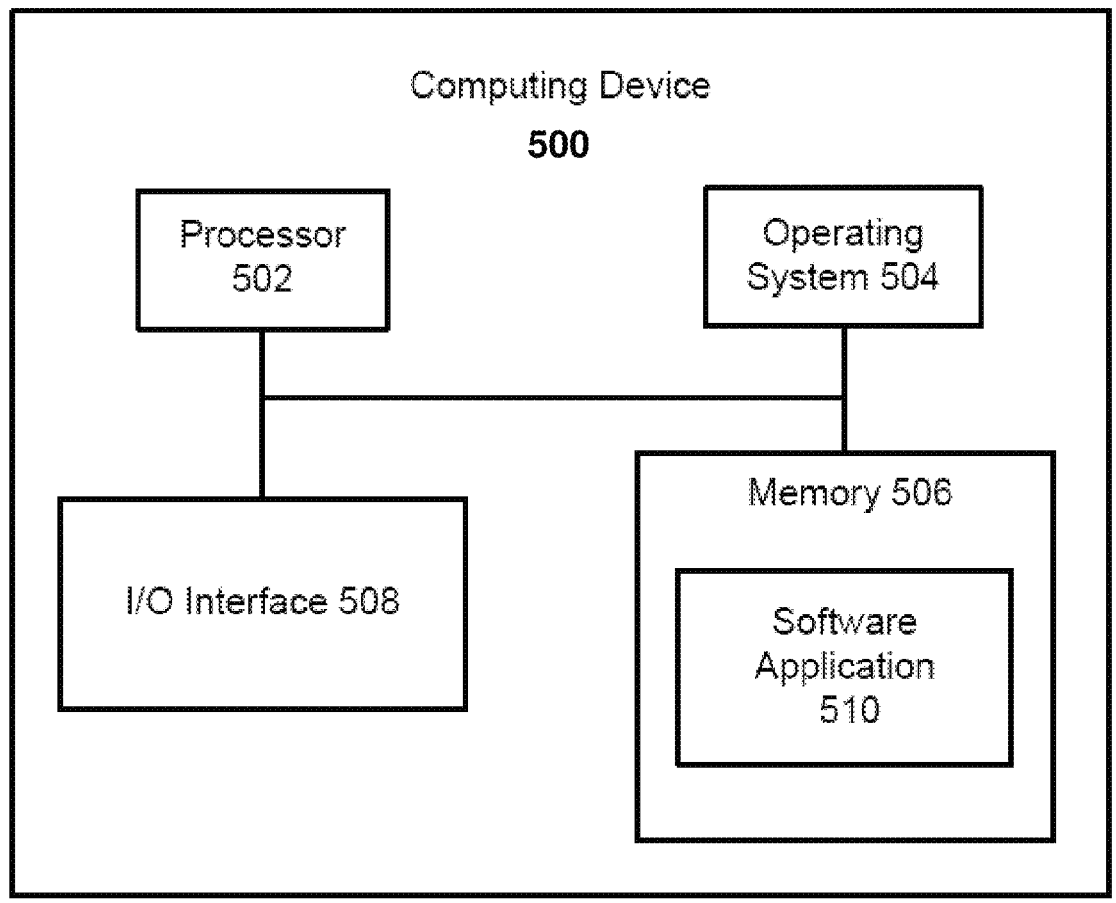
FIG. 6 is a general block diagram of a computing device usable to implement the embodiments.

FIG. 6 is a general block diagram of a computing device usable to implement the embodiments of FIGS. 1-3. While system 500 of FIG. 6 is described as facilitating performing the steps as described in certain implementations herein, any suitable component or combination of components of system 500 or any suitable processor processors associated with system 500 may be used for performing the steps described.

FIG. 6 illustrates a block diagram of an example computing system 500, which may be used for implementations described herein. For example, computing system 500 may be used to implement server devices 910, 920 of FIG. 5 as well as to perform the method implementations described herein, e.g., to run the administrator system 12 of FIGS. 1 and 2 wherein, for example, the software application 510 of FIG. 6 represents a browser, mobile application, or desktop client application tailored to facilitate interaction and communication with the computing environment 10, 90 of FIGS. 1 and 2.

In some implementations, computing system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing system 500 may be implemented by one or more processors or any combination of hardware devices, as well as any combination of hardware, software, firmware, etc.

For ease of illustration, FIG. 6 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Although the description has been described with respect to particular embodiments thereof, these particular embodiments are merely illustrative, and not restrictive. For example, while certain embodiments are discussed herein with respect to federation of servers of an enterprise computing environment, embodiments are not limited thereto. For example, embodiments may be adapted for use with Internet Of Things (IOT) networks of devices (e.g., smart-home devices and sensors) to facilitate monitoring and control of devices connected to the IOT network. Each of the devices may host federated MBean servers and may provide portals for monitoring and control of all other devices of the IOT network that have been federated, as discussed herein.

Furthermore, while specific implementations discussed herein may leverage MBeans and JMX technologies, embodiments are not limited thereto. Other types of computing objects (other than MBeans) may be employed to represent, monitor, and/or control computing resources in a computing environment and to implement embodiments discussed herein, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible and non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A non-transitory processor-readable storage device including logic for execution by one or more processors and when executed operable for facilitating sharing of software management functionality among components of a computing environment, by performing the following acts:
    receiving a query from a client module in communication with a first server, the query requesting access to information about software management functionality available on a second server;
    using the query to retrieve information pertaining to the software management functionality from a shared distributed record, wherein the information has been registered in the shared distributed record, resulting in retrieved information in response thereto;
    employing the retrieved information to create a local logical proxy for the software management functionality running on the second server, the local logical proxy maintained on the first server;
    selectively using the local logical proxy and the retrieved information to provide the software management functionality to the client module in response to one or more requests therefrom;
    providing a federation of peer-to-peer network servers that include the first server and the second server;
    replicating a tree on each of the peer-to-peer networked servers, wherein each of the peer-to-peer networked servers has a copy of the tree;
    propagating changes from one copy of the tree to other copies of the tree; and
    enabling each of the peer-to-peer networked servers to retrieve metrics from any of the peer-to-peer networked servers.

2. The non-transitory processor-readable storage device of claim 1, wherein the retrieved information includes a connector for software management functionality specified in the query, wherein the connector includes code for connecting to the software management functionality.

3. The non-transitory processor-readable storage device of claim 2, wherein the software management functionality is implemented via one or more computing resources that are exposed as one or more second Managed Beans (MBeans) hosted by an MBean server on the second server, wherein the one or more second MBeans are local to the second server.

4. The non-transitory processor-readable storage device of claim 3, wherein employing the retrieved information further includes:
using the retrieved information to generate one or more proxy MBeans on the first server for the one or more second MBeans; and using one or more connectors specified via the retrieved information to facilitate using the one or more proxy MBeans to access data and/or functionality of the one or more second MBeans.

5. The non-transitory processor-readable storage device of claim 1, wherein the first server includes a first application server running in or hosting a first virtual machine, and wherein the second server includes a second application server running in or hosting a second virtual machine.

6. The non-transitory processor-readable storage device of claim 5, wherein the first virtual machine and the second virtual machine are part of a similar server cluster that includes plural servers that are part of an administrative domain.

7. The non-transitory processor-readable storage device of claim 6, wherein the administrative domain is federated via code running one or more federation modules in communication with one or more replicated global namespaces.

8. The non-transitory processor-readable storage device of claim 7, wherein the one or more replicated global namespaces include a name hierarchy on each of the plural servers, wherein content of the name hierarchy is replicated, synchronized, and shared among the plural servers.

9. The non-transitory processor-readable storage device of claim 8, wherein the one or more replicated global namespaces are implemented, at least in part, via a Java Naming and Directory Interface (JNDI) tree.

10. The non-transitory processor-readable storage device of claim 6, wherein the software management functionality includes one or more computing objects, wherein the one or more computing objects includes an MBean, and wherein each of the plural servers include a federated MBean server.

11. A method for facilitating sharing software management functionality among components of a computing environment, the method comprising:
receiving a query from a client module in communication with a first server, the query requesting access to information about software management functionality available on a second server;
using the query to retrieve information pertaining to the software management functionality from a shared distributed record, wherein the information has been registered in the shared distributed record, resulting in retrieved information in response thereto;
employing the retrieved information to create a local logical proxy for the software management functionality running on the second server, the local logical proxy maintained on the first server;
selectively using the local logical proxy and the retrieved information to provide the software management functionality to the client module in response to one or more requests therefrom;
providing a federation of peer-to-peer network servers that include the first server and the second server;
replicating a tree on each of the peer-to-peer networked servers, wherein each of the peer-to-peer networked servers has a copy of the tree;
propagating changes from one copy of the tree to other copies of the tree; and
enabling each of the peer-to-peer networked servers to retrieve metrics from any of the peer-to-peer networked servers.

12. The method of claim 11, wherein the retrieved information includes a connector for software management functionality specified in the query, wherein the connector includes code for connecting to the software management functionality.

13. The method of claim 12, wherein the software management functionality is implemented via one or more computing resources that are exposed as one or more second Managed Beans (MBeans) hosted by an MBean server on the second server, wherein the one or more MBeans are local to the second server.

14. The method of claim 13, wherein employing the retrieved information further includes:
using the retrieved information to generate one or more proxy MBeans on the first server for the one or more second MBeans; and using one or more connectors specified via the retrieved information to facilitate using the one or more proxy MBeans to access data and/or functionality of the one or more second MBeans.

15. The method of claim 11, wherein the first server includes a first application server running in or hosting a first virtual machine, and wherein the second server includes a second application server running in or hosting a second virtual machine.

16. The method of claim 15, wherein the first virtual machine and the second virtual machine are part of a similar server cluster that includes plural servers that are part of an administrative domain.

17. The method of claim 16, wherein the administrative domain is federated via code running one or more federation modules in communication with one or more replicated global namespaces.

18. The method of claim 17, wherein the one or more replicated global namespaces include a name hierarchy on each of the plural servers, wherein content of the name hierarchy is replicated, synchronized, and shared among the plural servers.

19. The method of claim 8, wherein the one or more replicated global namespaces are implemented, at least in part, via a Java Naming and Directory Interface (JNDI) tree, and wherein the software management functionality includes one or more computing objects, wherein the one or more computing objects includes an MBean, and wherein each of the plural servers include a federated MBean server.

20. An apparatus comprising:
one or more processors;
logic encoded in one or more non-transitory media for execution by the one or more processors and when executed operable for:
receiving a query from a client module in communication with a first server, the query requesting access to information about software management functionality available on a second server;
using the query to retrieve information pertaining to the software management functionality from a shared distributed record, wherein the information has been registered in the shared distributed record, resulting in retrieved information in response thereto;
employing the retrieved information to create a local logical proxy for the software management functionality running on the second server, the local logical proxy maintained on the first server;

selectively using the local logical proxy and the retrieved information to provide the software management functionality to the client module in response to one or more requests therefrom;

providing a federation of peer-to-peer network servers that include the first server and the second server;

replicating a tree on each of the peer-to-peer networked servers, wherein each of the peer-to-peer networked servers has a copy of the tree;

propagating changes from one copy of the tree to other copies of the tree; and enabling each of the peer-to-peer networked servers to retrieve metrics from any of the peer-to-peer networked servers.

* * * * *

UNITED STATES PATENT AND TRADEMARK OFFICE
CERTIFICATE OF CORRECTION

Page 1 of 2

PATENT NO. : 10,931,508 B2
APPLICATION NO. : 16/027085
DATED : February 23, 2021
INVENTOR(S) : Le Mouel It is certified that error appears in the above-identified patent and that said Letters Patent is hereby corrected as shown below:

On the Title Page

On page 2, Column 1, Item (56) under Other Publications, Line 3, delete "8 pages." and insert -- 3 pages. --, therefor.

In the Specification

In Column 4, Line 37, delete "(TOT)" and insert -- (IOT) --, therefor.

In Column 5, Line 50, after ""client application,"" insert -- and --.

In Column 5, Line 59, after "term" insert -- "server" --.

In Column 7, Line 1, delete "(EAT)." and insert -- (EAI). --, therefor.

In Column 7, Line 18, delete "esource." and insert -- resource. --, therefor.

In Column 8, Line 62, delete "he" and insert -- be --, therefor.

In Column 8, Line 66, delete "Weans)" and insert -- MBeans) --, therefor.

In Column 14, Lines 7-8, delete "RESILIENCY FRAMEWORK, filed on Jul. 3, 2018 (Attorney ref. ORACP0237/ORA180597-US-NP)." and insert the same on Column 14, Line 6 as a continuation of the same paragraph.

In Column 14, Line 12, delete "he" and insert -- be --, therefor.

In Column 19, Line 6, after "functionality" insert -- (e.g., --.

In Column 19, Line 51, delete "he" and insert -- be --, therefor.

Signed and Sealed this
Thirteenth Day of July, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,931,508 B2

In Column 23, Line 7, delete "data," and insert -- data --, therefor.

In Column 24, Line 14, after "processor" insert -- or --.

In the Claims

In Column 28, Line 43, in Claim 19, delete "claim 8," and insert -- claim 11, --, therefor.